(12) United States Patent
Qin

(10) Patent No.: US 9,154,401 B2
(45) Date of Patent: Oct. 6, 2015

(54) METHOD AND DEVICE FOR ESTABLISHING ROUTER NEIGHBOR

(71) Applicant: Huawei Technologies Co., Ltd., Shenzhen, Guangdong (CN)

(72) Inventor: Yun Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 14/010,205

(22) Filed: Aug. 26, 2013

(65) Prior Publication Data

US 2013/0336434 A1 Dec. 19, 2013

Related U.S. Application Data

(63) Continuation of application No. PCT/CN2011/076665, filed on Jun. 30, 2011.

(51) Int. Cl.
*H04L 12/751* (2013.01)
*H04L 12/66* (2006.01)

(52) U.S. Cl.
CPC .............. *H04L 45/026* (2013.01); *H04L 45/02* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 5,473,599 A * | 12/1995 | Li et al. ..................... | 370/219 |
| 5,953,312 A * | 9/1999 | Crawley et al. ............... | 370/218 |
| 7,203,175 B2 * | 4/2007 | Thubert et al. ................ | 370/254 |
| 7,706,304 B2 * | 4/2010 | Sinicrope et al. ............. | 370/254 |
| 2003/0123457 A1 | 7/2003 | Koppol | |
| 2008/0317047 A1 * | 12/2008 | Zeng et al. .................... | 370/401 |

FOREIGN PATENT DOCUMENTS

| | | |
|---|---|---|
| CN | 1866962 A | 11/2006 |
| CN | 101009702 A | 8/2007 |
| CN | 101119304 A | 2/2008 |
| CN | 101515859 A | 8/2009 |
| CN | 102111325 A | 6/2011 |
| EP | 1 359 716 A1 | 11/2003 |
| WO | WO 2009/113786 A2 | 9/2009 |

OTHER PUBLICATIONS

A. Lindem, "Extensions to OSPF for Advertising Optional Router Capabilities", Network Working Group, Jul. 2007, 13 pages.
Gabor Retvari, et al., "OSPF for Implementing Self-adaptive Routing in Autonomic Networks: a Case Study", Dec. 31, 2009, 14 pages.
J. Moy, "OSPF Version 2", Network Working Group, Internet Draft, Ascend Communications, Inc., Jan. 1998, 223 pages.
International Search Report datd Mar. 29, 2012 in connection with International Patent Application No. PCT/CN2011/076665.
J. Moy, "OSPF Version 2", RFC 2328, Network Working Group, Apr. 1998, 204 pages.

* cited by examiner

*Primary Examiner* — Hong Cho

(57) ABSTRACT

Embodiments of the present invention relate to a method and a device for establishing a router neighbor. The method includes: obtaining a first discovery protocol Hello message sent by a neighbor router, where the first Hello message carries identification information and priority information of the neighbor router; and determining whether to add the relevant information of the neighbor router into the neighbor list of a local end router, according to the priority information of the neighbor router, and/or priority information of the local end router, and/or whether the identification information of the neighbor router is identification information of an opposite end device of a virtual link configured for the local end router. The embodiments of the present invention ensure that a small device can establish neighbor relationships with a DR and a BDR on a network and that the small device's OSPF function is normal.

14 Claims, 3 Drawing Sheets

METHOD AND DEVICE FOR ESTABLISHING ROUTER NEIGHBOR

CROSS-REFERENCE TO RELATED APPLICATIONS

This application is a continuation of International Application No. PCT/CN2011/076665, filed on Jun. 30, 2011, which is hereby incorporated by reference in its entirety.

TECHNICAL FIELD

The present invention relates to the field of information technologies, and in particular, to a method and a device for establishing a router neighbor.

BACKGROUND

Open Shortest Path First (Open Shortest Path First; OSPF) is an interior gateway protocol. The protocol specifies that routers on a subnet include: a designated router (Designated Router; DR), a backup designated router (Backup Designated Router; BDR), and a non-designated router or a non-backup designated router (Not DR or BDR; DR Other). All routers on the subnet have a same link state database (Link state database; LSDB). The DR generates a link state advertisement (Link state advertisement; LSA) representing the network. A router on the subnet needs to exchange LSDB information with the DR; the DR generates a piece of information (Network LSA) that describes the network for the network, and the DR floods the information to all other routers on the subnet. A router on the subnet, according to information (Router LSA) that describes a router node in the LSDB and the Network LSA in the LSDB, calculates a shortest path tree which adapts a local end as a root node, and calculates all routes in a subnet area according to the shortest path tree.

In the prior art, any node on a network needs to establish neighbor relationships with all other devices. However, a small device with a limited processing resource, after establishing neighbor relationships with a part of devices, may fail to establish connection relationships with other devices. Once these devices fail to establish router adjacency with routers that may function as a DR and a BDR, an OSPF function of these devices is affected. For example, subnet routes cannot be calculated or route information of a local end router cannot be released.

SUMMARY

A method and a device for establishing a router neighbor are provided by embodiments of the present invention, so as to solve the problem in the prior art that a small device cannot establish neighbor relationships with all devices on a network, and that an OSPF function is affected.

An embodiment of the present invention provides a method for establishing a router neighbor, including:
  obtaining a first discovery protocol Hello message sent by a neighbor router, where the first Hello message carries identification information and priority information of the neighbor router; and
  determining whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router.

An embodiment of the present invention further provides a router, including:
  an obtaining unit, configured to obtain a first discovery protocol Hello message sent by a neighbor router, where the first Hello message carries identification information and priority information of the neighbor router; and
  a determining unit, configured to determine whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router.

In the method and the device for establishing a router neighbor that are provided by the embodiments of the present invention, after receiving the Hello message from the neighbor router, the local end router determines whether to establish a neighbor relationship with the neighbor router, according to the priority information of the neighbor router, and/or the priority information of the local end router, and whether the neighbor router is an opposite end device of a virtual link configured for the local end router, thereby ensuring that a small device can establish neighbor relationships with a DR and a BDR on the network, and ensuring a normal OSPF function of the small device.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
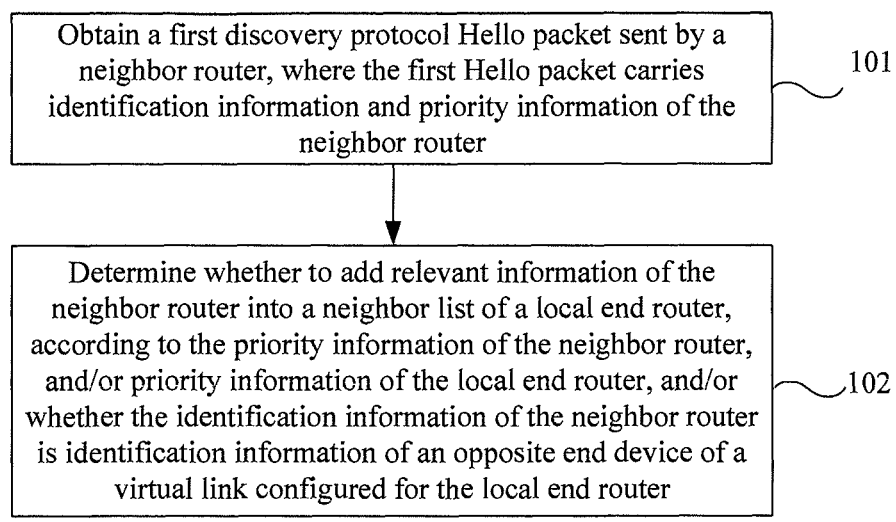
FIG. 1 is a schematic flowchart of a method for establishing a router neighbor according to an embodiment of the present invention.

FIG. 1 is a schematic flowchart of a method for establishing a router neighbor according to an embodiment of the present invention. As shown in FIG. 1, the method includes:

S101: Obtain a first discovery protocol Hello message sent by a neighbor router, where the first Hello message carries identification information and priority information of the neighbor router.

S102: Determine whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router.

The executor of the above mentioned steps is a router. The router may be a device that has a routing function on a communications network, for example, a sensor that has a routing function on an Internet of Things.

The embodiments of the present invention are applicable to a router that can function as a DR or BDR, and in particular, to a small router that gives priority to processing performance and resources.

On a communications network that adopts a protocol such as OSPF, a router discovers a neighbor router by using a Hello message. Information carried by the first Hello message includes: the identification information of the neighbor router and the priority information of the neighbor router. It should be noted that, the information carried by the first Hello message that is involved in the embodiment only mentions the identification information of the neighbor router and the priority information of the neighbor router that are involved in the present invention; in fact, the first Hello message further carries a neighbor list of the neighbor router, where the neighbor list includes relevant information of a router that establishes a neighbor relationship with the neighbor router, and the relevant information may include: identification information and priority information of the router that establishes a neighbor relationship with the neighbor router, and so on.

The local end router, after obtaining the first Hello message sent by the neighbor router, first judges whether the neighbor router is a neighbor that has already been discovered. If the neighbor router is a neighbor that has been already discovered, a message event (HelloRecv event) is returned to a neighbor state machine of the local end router. If the neighbor router is not a neighbor that has already been discovered, the local end router determines whether to establish a neighbor relationship with the neighbor router, according to the priority information of the neighbor router, and/or the priority information of the local end router, and/or whether the identification information of the neighbor router is the identification information of an opposite end device of a virtual link configured for the local end router (that is, whether the neighbor router is an opposite end device of a virtual link configured for the local end router).

Specifically, if the priority of the neighbor router is not 0, it indicates that the neighbor router may function as a DR or BDR, and a neighbor relationship needs to be established with the neighbor router; the establishing a neighbor relationship with the neighbor router is specifically: adding the relevant information of the neighbor router into the neighbor list of the local end router (that is, establishing a data structure of the neighbor router in the neighbor list of the local end router), where the relevant information of the neighbor router that is added into the neighbor list of the local end router may include: the identification information, priority information, and other information of the neighbor router; similarly, if the priority of the local end router is not 0, it indicates that the local end router may function as a DR or BDR; because a DR needs to exchange LSDB information with all routers on a subnet and generates Network LSA information for the subnet, the DR needs to establish neighbor relationships with all neighbor routers; therefore, if the local end router may function as a DR or BDR, it needs to establish a neighbor relationship with the neighbor router and adds the relevant information of the neighbor router into the neighbor list of the local end router; and in addition, if the identification information of the neighbor router is the identification information of an opposite end device of a virtual link configured for the local end router (that is, the neighbor router is an opposite end device of a virtual link configured for the local end router), it needs to establish a neighbor relationship with the neighbor router and add the relevant information of the neighbor router into the neighbor list of the local end router.

If the priority of the neighbor router that sends the first Hello message is 0, generally, the neighbor router may not function as a DR or BDR. Similarly, if the priority of the local end router is 0, generally, the local end router may not function as a DR or BDR. If the priority of the neighbor router is 0, the priority of the local end router is 0, and the neighbor router is not an opposite end device of a virtual link configured for the local end router, a neighbor relationship may not be established with the neighbor router, that is, the relevant information of the neighbor router is not added into the neighbor list of the local end router but the first Hello message is directly discarded.

If the local end router determines not to establish a neighbor relationship with the neighbor router, the local end router does not need to update the neighbor list of the local end router, and the neighbor list of the local end router does not include the relevant information of the neighbor router, thereby saving a memory resource and a processing resource of the local end router, ensuring that the local end router can establish neighbor relationships with a DR and a BDR on the network, and ensuring a normal OSPF function of a small device. In addition, when an interface state machine of the local end router times out, DR election is entered. A DR election list of the local end router neither includes the relevant information of the neighbor router, thereby simplifying a DR election process and improving the DR election efficiency.

Further, because the first Hello message may further carry the neighbor list of the neighbor router, if the neighbor router does not discover the local end router, or, the neighbor router discovers the local end router but does not establish a neighbor relationship with the local end router, the neighbor list of the neighbor router does not include relevant information of the local end router. If it is determined to establish a neighbor relationship with the neighbor router and add the relevant information of the neighbor router into the neighbor list of the local end router, the state of the neighbor router may be further set to state 1 (1-WAY), representing that the local end router discovers the neighbor router but the neighbor router does not discovers the local end router.

If the neighbor list of the neighbor router includes the relevant information of the local end router, it indicates that the neighbor router discovers the local end router and establishes a neighbor relationship with the local end router; and the state of the neighbor router in the neighbor list of the local end router may be set to state 2 (2-WAY), representing that the local end router discovers the neighbor router and the neighbor router discovers the local end router.

If the local end router determines not to establish a neighbor relationship with the neighbor router, the neighbor list carried in a second Hello message broadcasted by the local end router does not include the relevant information of the neighbor router. If the local end router determines to establish a neighbor relationship with the neighbor router, the local end router needs to add the relevant information of the neighbor router into the neighbor list of the local end router, and the neighbor list carried in a third Hello message broadcasted by the local end router includes the relevant information of the neighbor router.

When the state of a certain neighbor router in the neighbor list of the local end router is state 2, that is, the local end router discovers the neighbor router and the neighbor router discovers the local end router, and when the interface state machine of the local end router times out and the DR election is entered, the relevant information of the neighbor router is added into the DR election list. It can be seen that, if a local end router, when receiving a Hello message from each other, may determine whether to establish a neighbor relationship, according to priority information and whether it is an opposite end device of a virtual link configured for the local end router, the relevant information of a router that may not function as a DR or BDR may be avoided to be added into the DR list to participate the DR election, thereby simplifying the DR election process and improving the DR election efficiency.

It should be noted that, the first message, the second message, and the third message that are involved in the present invention are used to distinguish Hello messages broadcasted by different routers, and generally refer to all Hello messages sent by a certain router but do not specifically refer to a certain message sent by a certain router.

In the method for establishing a router neighbor that is provided by the embodiment of the present invention, after receiving the Hello message from the neighbor router, the local end router determines whether to establish a neighbor relationship with the neighbor router, according to the priority information of the neighbor router, and/or the priority information of the local end router, and whether the neighbor router is an opposite end device of a virtual link configured for the local end router, thereby ensuring that a small device can establish neighbor relationships with a DR and a BDR on a network, and ensuring a normal OSPF function of the small device.

Figure 2:
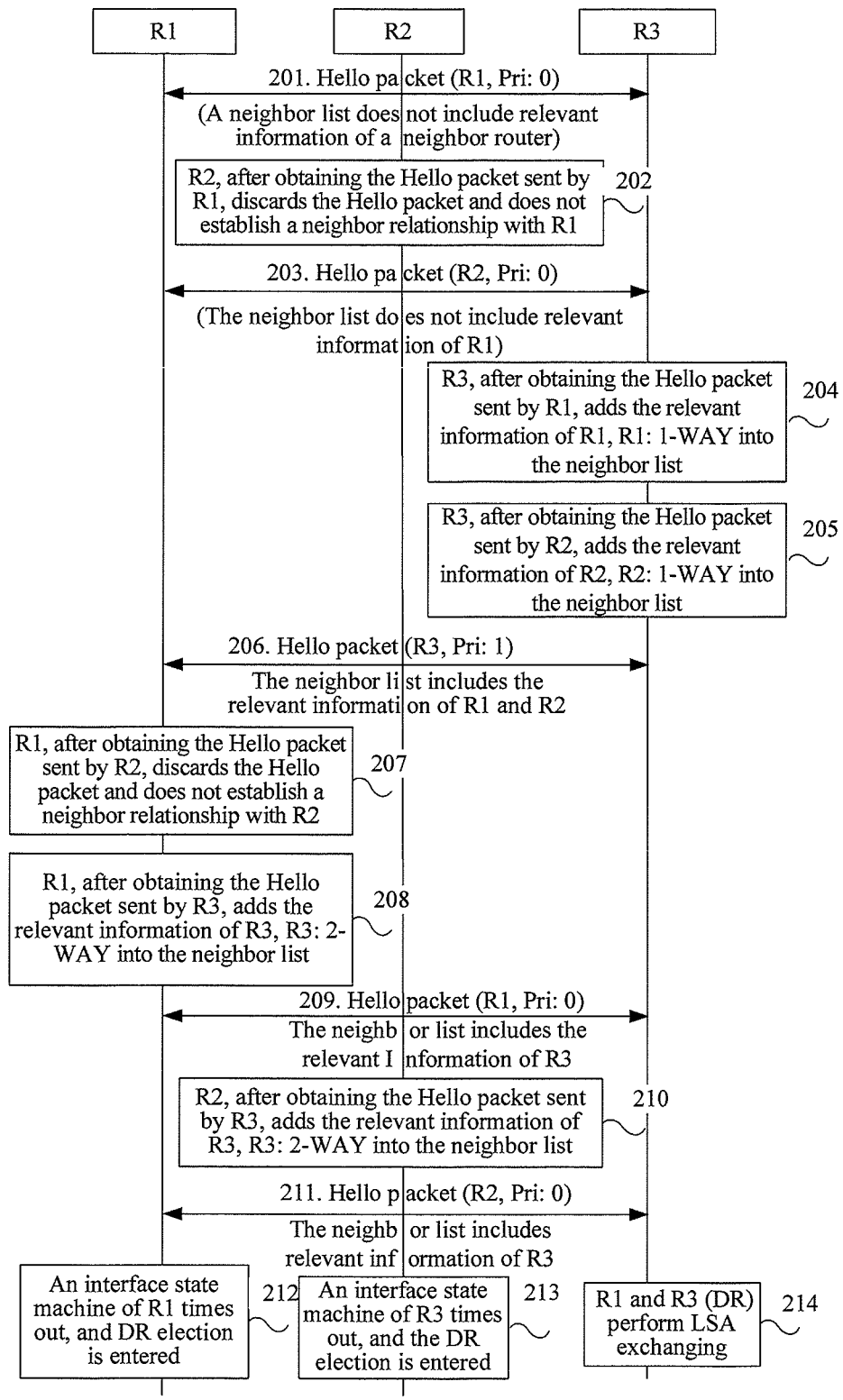
FIG. 2 is a schematic flowchart of a method for establishing a router neighbor according to another embodiment of the present invention.

FIG. 2 is a schematic flowchart of a method for establishing a router neighbor according to another embodiment of the present invention. As shown in FIG. 2, the embodiment provides a complete procedure of router neighbor establishing, DR election, and router LSA exchanging. In the process of the router neighbor establishing, a local end router determines whether to establish a neighbor relationship with a neighbor router, according to the priority of the neighbor router, the priority of the local end router, and whether the neighbor router is an opposite end device of a virtual link configured for the local end router.

Both Router 1 (Router1; R1) and Router 2 (Router2; R2) are low-end devices. The priority of R1 is 0 (Pri: 0), and the priority of R2 is 0 (Pri: 0); R1 and R2 may only function as DR Other. The priority of Router 3 (Router3; R3) is 1 (Pri: 1) and R3 may function as a DR or BDR. R1 is not an opposite end device of a virtual link configured for R2. R2 is not an opposite end device of a virtual link configured for R1.

The method specifically includes:

The router neighbor establishing part:

S201: R1 broadcasts a Hello message, where the message carries identification information and priority information (Pri: 0) of R1.

It is assumed that R1 does not establish a neighbor relationship with any other router on the network. In this case, a neighbor list carried in the Hello message broadcasted by R1 does not include relevant information of a neighbor router.

S202: R2, after obtaining the Hello message sent by R1, discards the Hello message and does not establish a neighbor relationship with R1.

Specifically, R2 judges that the priority of R1 is 0; therefore R1 may not function as a DR or BDR; R2 further judges that the priority of the local end router is 0, and the local end router may not function as a DR or BDR; and R2 further judges that R1 is not an opposite end device of a virtual link configured for the local end router; therefore, R2 discards the Hello message, does not establish a neighbor relationship with R1, and does not add relevant information of R1 into a neighbor list of the local end router.

S203: R2 broadcasts a Hello message, where the message carries identification information and priority information (Pri: 0) of R2. In this case, because R2 does not establish a neighbor relationship with R1, a neighbor list carried in the Hello message broadcasted by R2 does not include the identification information of R1.

S204: R3, after obtaining the Hello message sent by R1, adds the relevant information of R1 into the neighbor list (the embodiment uses only adding the identification information of the neighbor router into the neighbor list as an example; in fact, the neighbor list may further include other information of the neighbor router, for example, priority information, and so on), and establishes a neighbor relationship with R1. Because the neighbor list in the Hello message sent by R1 does not include relevant information of R3, R3 sets the state of R1 in the neighbor list of the local end router to state 1 (R1: 1-WAY).

Specifically, R3 judges that the priority of R1 is 0; therefore R1 may not function as a DR or BDR; R3 further judges that the priority of the local end is 1, so that the local end router may function as a DR or BDR; and R3 adds the relevant information of R1 into the neighbor list and establishes a neighbor relationship with R1.

1-WAY in S204 represents that R3 discovers R1 but R1 does not discover R3.

S205: R3, after obtaining the Hello message sent by R2, adds the relevant information of R2 into the neighbor list and establishes a neighbor relationship with R2. Because the neighbor list in the Hello message sent by R2 does not include the relevant information of R3, R3 sets the state of R2 in the neighbor list of the local end router to state 1 (R2: 1-WAY).

Specifically, R3 judges that the priority of R2 is 0; therefore R2 may not function as a DR or BDR; R3 further judges that the priority of the local end is 1, so that the local end router may function as a DR or BDR; and R3 adds the relevant information of R2 into the neighbor list and establishes a neighbor relationship with R2.

1-WAY in S205 represents that R3 discovers R2 but R2 does not discover R3.

In this case, a neighbor list of R3 includes:

R1: 1-WAY
R2: 1-WAY

S206: R3 broadcasts a Hello message, where the message carries identification information and priority information (Pri: 1) of R3. In this case, a neighbor list carried in the Hello message broadcasted by R3 carries the relevant information of R1 and R2.

S207: R1, after obtaining the Hello message sent by R2, discards the Hello message and does not establish a neighbor relationship with R2.

Specifically, R1 judges that the priority of R2 is 0; therefore R2 may not function as a DR or BDR; R1 further judges that the priority of the local end is 0, so that the local end router may not function as a DR or BDR; and R1 further judges that R2 is not an opposite end device of a virtual link configured for the local end router; therefore, R1 discards the Hello message and does not establish a neighbor relationship with R2.

S208: R1, after obtaining the Hello message sent by R3, adds the relevant information of R3 into the neighbor list and establishes a neighbor relationship with R3. Because the neighbor list in the Hello message sent by R3 includes the relevant information of R1, R1 sets the state of R3 in the neighbor list of the local end router to state 2 (R3: 2-WAY).

Specifically, R1 judges that the priority of R3 is 1; therefore R3 may function as a DR or BDR; and R1 adds the relevant information of R3 into the neighbor list and establishes a neighbor relationship with R3, where 2-WAY in S208 represents that R1 discovers R3 and R3 discovers R1.

S209: R1 broadcasts a Hello message, where the message carries the identification information and the priority information (Pri: 0) of R1. In this case, the neighbor list carried in the Hello message broadcasted by R1 carries the relevant information of R3.

S210: R2, after obtaining the Hello message sent by R3, adds the relevant information of R3 into the neighbor list and establishes a neighbor relationship with R3. Because the neighbor list in the Hello message sent by R3 includes the relevant information of R2, R2 sets the state of R3 in the neighbor list of the local end router to state 2 (R3: 2-WAY).

Specifically, R2 judges that the priority of R3 is 1; therefore R3 may function as a DR or BDR; and R2 adds the relevant information R3: 2-WAY of R3 into the neighbor list and establishes a neighbor relationship with R3, where 2-WAY in S210 represents that R2 discovers R3 and R3 discovers R2.

S211: R2 broadcasts a Hello message, where the message carries the identification information and the priority information (Pri: 0) of R2. In this case, the neighbor list carried in the Hello message broadcasted by R2 carries the relevant information of R3.

It should be noted that, there is no particular order for two routers to receive Hello messages broadcasted by another router. For example, there is no particular order for R2 to receive the Hello message sent by R1 in S202 and for R3 to receive the Hello message sent by R1 in S204. In addition, there is no particular order for R2 to broadcast the Hello message in S203 and for R3 to broadcast the Hello message. This will not be elaborated one by one.

The DR election part:

S212: An interface state machine of R1 times out, enter DR election.

A DR election list of R1 includes: R1 and R3.

S213: An interface state machine of R2 times out, and DR election is entered.

A DR election list of R2 includes: R2 and R3.

S213: An interface state machine of R3 times out, and DR election is entered.

A DR election list of R3 includes: R1, R2, and R3.

The DR election list of each router includes additional identification information of the local end router as compared with the neighbor list. A neighbor state machine of the local end router is used to discover a neighbor router. When a certain neighbor router reaches the 2-WAY state, that is, the local end router discovers the neighbor router and the neighbor router discovers the local end router, the local end router adds the identification information of the neighbor router into the DR election list.

In addition, it should be noted that, timeout time of the interface state machine of R1, timeout time of the interface state machine of R2, and timeout time of the interface state machine of R3 may be different and are in no particular order.

A communications system can ensure, according to an election algorithm, that a same router is elected by each router to function as a DR.

After the DR election, the interface state machine of R1 changes to DR other, the interface state machine of R2 changes to DR other, and the interface state machine of R3 changes to DR.

The LSA exchanging part:

S214: R1 and R3 (DR) perform LSA exchanging.

A process that R1 and the DR perform the LSA exchanging includes a plurality of pieces of unicast signaling exchanged between R1 and R3, which is the prior art and is represented by only one piece of signaling in FIG. 2.

After R1 finishes LSA exchanging with R3 (DR), the neighbor list of R1 is: R3: FULL (full state), where R3: FULL represents that R1 finishes the LSA exchanging with R3. After R2 finishes the LSA exchanging with the DR, the neighbor list of R2 is: R3: FULL, representing that R2 finishes the LSA exchanging with R3. After R3 finishes the LSA exchanging with R1 and R2, the neighbor list of R3 is: R1: FULL, and R2: FULL.

In the method for establishing a router neighbor that is provided by the embodiment of the present invention, after the local end router receives the Hello message sent by the neighbor router, the local end router determines whether to establish a neighbor relationship with the neighbor router, according to the priority information of the neighbor router, the priority information of the local end router, and whether the neighbor router is an opposite end device of a virtual link configured for the local end router, thereby ensuring that a small device can establish neighbor relationships with a DR and a BDR on a network, and ensuring a normal OSPF function of the small device. If the local end router determines not to establish a neighbor relationship with the neighbor router, the local end router does not need to update the neighbor list. When the interface state machine of the local end router times out, the DR election is entered. A DR election list of the local end router neither includes the identification information of the neighbor router, thereby simplifying a DR election process and improving the DR election efficiency.

It should be noted that, for brevity, the foregoing method embodiments are represented as a series of action combinations. However, persons skilled in the art should understand that the present invention is not limited to the order of the described actions, because according to the present invention, some steps may be performed in another order or simultaneously. It should be also understood by persons skilled in the art that the described embodiments all belong to exemplary embodiments, and the involved actions and modules are not necessarily required by the present invention.

In the foregoing embodiments, the description of each embodiment has respective focuses. For a part that is not described in detail in a certain embodiment, reference may be made to related descriptions in other embodiments.

Persons of ordinary skill in the art may understand that all or a part of the steps of the methods in the embodiments may be implemented by a program instructing relevant hardware. The program may be stored in a computer readable storage medium. When the program is run, the steps of the methods in the embodiments are performed. The storage medium may include medium that is capable of storing program codes, such as, a ROM, a RAM, a magnetic disk, and an optical disk.

Figure 3:
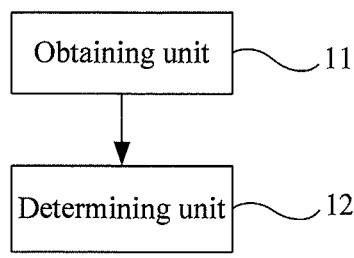
FIG. 3 is a schematic structural diagram of a router according to an embodiment of the present invention.

FIG. 3 is a schematic structural diagram of a router according to an embodiment of the present invention. As shown in FIG. 3, the router includes: an obtaining unit 11 and a determining unit 12.

The obtaining unit 11 is configured to obtain a first discovery protocol Hello message sent by a neighbor router, where the first Hello message carries identification information and priority information of the neighbor router.

The determining unit 12 is configured to determine whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router.

The router provided by the embodiment of the present invention may be a device that has a routing function on a communications network, for example, a sensor that has the routing function on an Internet of Things. The router may be a router that can function as a DR or BDR and may also be a small router that gives priority to processing performance and resources.

On a communications network that adopts a protocol such as OSPF, a Hello message is used among routers to discover a neighbor router. After the obtaining unit 11 obtains the first Hello message sent by the neighbor router, the determining unit 12 can determine whether to establish a neighbor relationship with the neighbor router, according to the priority information of the neighbor router, and/or the priority information of the local end router, and/or whether the identification information of the neighbor router is the identification information of an opposite end device of a virtual link configured for the local end router (that is, whether the neighbor router is an opposite end device of a virtual link configured for the local end router).

Specifically, the determining unit 12 may judge, according to the priority information of the neighbor router, that the neighbor router can function as a DR or BDR; if the priority of the neighbor router is not 0, it indicates that the neighbor router may function as a DR or BDR, so that the determining unit 12 determines that a neighbor relationship needs to be established with the neighbor router; similarly, the determining unit 12 may also judge, according to the priority information of the local end router, whether the local end router can function as a DR or BDR; if the priority of the local end router is not 0, it indicates that the local end router may function as a DR or BDR; because a DR needs to exchange LSDB information with all routers on a subnet and generates Network LSA information for the subnet, the determining unit 12 determines that neighbor relationships need to be established with all neighbor routers; therefore, if the local end router may function as a DR or BDR, the determining unit 12 determines that a neighbor relationship needs to be established with the neighbor router; and in addition, if the neighbor router is an opposite end device of a virtual link configured for the local end router, the determining unit 12 determines that a neighbor relationship needs to be established with the neighbor router and a data structure of the neighbor router needs to be established in the neighbor list.

If the priority of the neighbor router that sends the first Hello message is 0, generally, the neighbor router may not function as a DR or BDR. Similarly, if the priority of the local end router is 0, generally, the local end router may not function as a DR or BDR. If the priority of the neighbor router is 0, the priority of the local end router is 0, and the neighbor router is not an opposite end device of a virtual link configured for the local end router, the determining unit 12 can determine not to establish a neighbor relationship with the neighbor router but directly discards the first Hello message.

If the determining unit 12 determines not to establish a neighbor relationship with the neighbor router, the local end router does not need to update the neighbor list. When an interface state machine of the local end router times out, DR election is entered. A DR election list of the local end router neither includes the identification information of the neighbor router, thereby simplifying a DR election process and improving the DR election efficiency.

The router provided by the embodiment of the present invention, after receiving the Hello message from the neighbor router, determines whether to establish a neighbor relationship with the neighbor router, according to the priority information of the neighbor router, and/or the priority information of the local end router, and whether the neighbor router is an opposite end device of a virtual link configured for the local end router, thereby ensuring that a small device can establish neighbor relationships with a DR and a BDR on a network, and ensuring a normal OSPF function of the small device.

Figure 4:
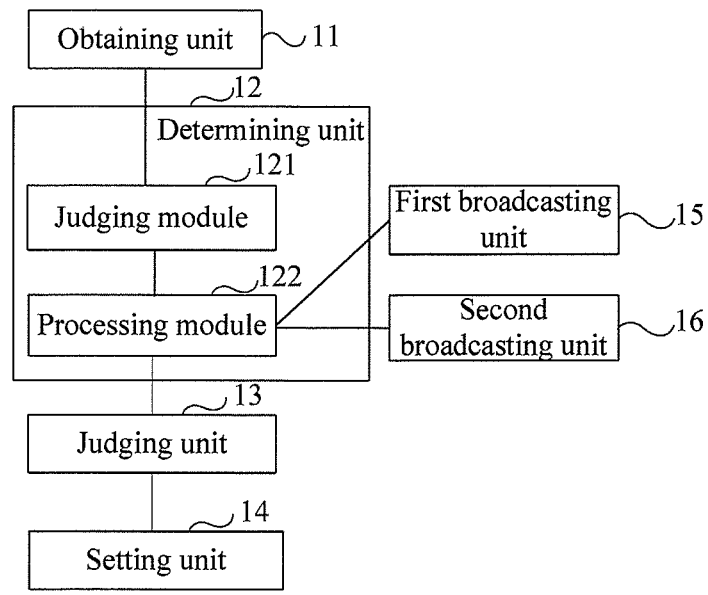
FIG. 4 is a schematic structural diagram of a router according to another embodiment of the present invention.

FIG. 4 is a schematic structural diagram of a router according to another embodiment of the present invention. As shown in FIG. 4, the router includes: an obtaining unit 11 and a determining unit 12.

Further, the first Hello message further carries a neighbor list of the neighbor router. If the determining unit 12 determines to add relevant information of the neighbor router into a neighbor list of the local end router, the router provided by the embodiment may further include:

a judging unit 13, configured to judge whether the neighbor list of the neighbor router includes relevant information of the local end router; and a setting unit 14, configured to: if the neighbor list of the neighbor router does not include the relevant information of the local end router, set the state of the neighbor router in the neighbor list of the local end router to state 1, where the state 1 is used to represent that the local end router discovers the neighbor router and the neighbor router does not discover the local end router; or if the neighbor list of the neighbor router includes the relevant information of the local end router, set the state of the neighbor router in the neighbor list of the local end router to state 2, where the state 2 is used to represent that the local end router discovers the neighbor router and the neighbor router discovers the local end router.

The determining unit 12 may further include: a judging module 121 and a processing module 122.

The judging module 121 is configured to: judge, according to the priority information of the neighbor router, whether the priority of the neighbor router is 0; if the priority of the neighbor router is 0, judge, according to the priority information of the local end router, whether the priority of the local end router is 0; and if the priority of the local end router is 0, judge whether the identification information of the neighbor router is the identification information of an opposite end device of a virtual link configured for the local end router.

The processing module 122 is configured to: if the judging module judges that the identification information of the neighbor router is not the identification information of an opposite end device of a virtual link configured for the local end router, discard the first Hello message.

On such a basis, the router provided by the embodiment may further include: a first broadcasting unit 15.

The first broadcasting unit 15 is configured to broadcast a second Hello message after the processing module 122 discards the first Hello message, where the second Hello message carries the identification information and priority information of the local end router and the second Hello message further carries the neighbor list of the local end router, where the neighbor list of the local end router does not include the relevant information of the neighbor router.

As another feasible implementation manner, the processing module 122 may be further configured to: if the judging module 121 judges that the priority of the neighbor router is not 0, add the relevant information of the neighbor router into the neighbor list of the local end router.

The processing module 122 may be further configured to: if the judging module 121 judges that the priority of the local end router is not 0, add the relevant information of the neighbor router into the neighbor list of the local end router.

The processing module 122 may also be configured to: if the judging module 121 judges that the identification information of the neighbor router is the identification information of an opposite end device of a virtual link configured for the local end router, add the relevant information of the neighbor router into the neighbor list of the local end router.

Further, the router provided by the embodiment may further include: a second broadcasting unit 16.

The second broadcasting unit 16 is configured to broadcast a third Hello message after the processing module adds the relevant information of the neighbor router into the neighbor list of the local end router, where the third Hello message carries the identification information and priority information of the local end router and the third Hello message further carries the neighbor list of the local end router, where the neighbor list of the local end router includes the relevant information of the neighbor router.

The router provided by the embodiments of the present invention is a device that executes the method for establishing a router neighbor that is provided by the embodiments of the present invention; for its specific process of implementing the method for establishing a router neighbor, reference may be made to the method embodiments; and the specific process is not detailed here.

The router provided by the embodiments of the present invention, after receiving a Hello message sent by the neighbor router, determines whether to establish a neighbor relationship with the neighbor router, according to the priority information of the neighbor router, the priority information of the local end router, and whether the neighbor router is an opposite end device of a virtual link configured for the local end router, thereby ensuring that a small device can establish neighbor relationships with a DR and a BDR on a network, and ensuring a normal OSPF function of the small device. If it is determined not to establish a neighbor relationship with the neighbor router, the neighbor list does not need to be updated. When an interface state machine times out, DR election is entered; and a DR election list neither includes the identification information of the neighbor router, thereby simplifying a DR election process and improving the DR election efficiency.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not make the essence of corresponding technical solutions depart from the scope of the technical solutions of the embodiments of the present invention.

What is claimed is:

1. A method for establishing a router neighbor, the method comprising:
   obtaining a first discovery protocol Hello message sent by a neighbor router, wherein the first Hello message carries identification information and priority information of the neighbor router; and
   determining whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router;
   wherein the first Hello message further carries a neighbor list of the neighbor router, and if it is determined to add the relevant information of the neighbor router into the neighbor list of the local end router, the method further comprises:
      judging whether the neighbor list of the neighbor router comprises relevant information of the local end router; and
      if the neighbor list of the neighbor router does not comprise the relevant information of the local end router, setting the state of the neighbor router in the neighbor list of the local end router to state 1, wherein the state 1 is used to represent that the local end router discovers the neighbor router and the neighbor router does not discover the local end router; or if the neighbor list of the neighbor router comprises the relevant information of the local end router, setting the state of the neighbor router in the neighbor list of the local end router to state 2, wherein the state 2 is used to represent that the local end router discovers the neighbor router and the neighbor router discovers the local end router.

2. A method for establishing a router neighbor, the method comprising:
   obtaining a first discovery protocol Hello message sent by a neighbor router, wherein the first Hello message carries identification information and priority information of the neighbor router; and
   determining whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router;
   wherein determining whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router comprises:
      judging, according to the priority information of the neighbor router, whether the priority of the neighbor router is 0;
      if the priority of the neighbor router is 0, judging, according to the priority information of the local end router, whether the priority of the local end router is 0;
      if the priority of the local end router is 0, judging whether the identification information of the neighbor router is the identification information of an opposite end device of a virtual link configured for the local end router; and if the identification information of the neighbor router is not the identification information of an opposite end device of a virtual link configured for the local end router, discarding the first Hello message.

3. The method according to claim 2, after discarding the first Hello message, the method further comprises:
broadcasting a second Hello message, wherein the second Hello message carries the identification information and priority information of the local end router and the second Hello message further carries the neighbor list of the local end router, wherein the neighbor list of the local end router does not comprise the relevant information of the neighbor router.

4. The method according to claim 2, further comprising:
if the priority of the neighbor router is not 0, adding the relevant information of the neighbor router into the neighbor list of the local end router.

5. The method according to claim 2, further comprising:
if the priority of the local end router is not 0, adding the relevant information of the neighbor router into the neighbor list of the local end router.

6. The method according to claim 2, further comprising:
if the identification information of the neighbor router is the identification information of an opposite end device of a virtual link configured for the local end router, adding the relevant information of the neighbor router into the neighbor list of the local end router.

7. The method according to claim 6, after adding the relevant information of the neighbor router into the neighbor list of the local end router, the method further comprises:
broadcasting a third Hello message, wherein the third Hello message carries the identification information and priority information of the local end router and the third Hello message further carries the neighbor list of the local end router, wherein the neighbor list of the local end router comprises the relevant information of the neighbor router.

8. A router, comprising:
an obtaining unit, configured to obtain a first discovery protocol Hello message sent by a neighbor router, wherein the first Hello message carries identification information and priority information of the neighbor router; and
a determining unit, configured to determine whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router;
wherein the first Hello message further carries a neighbor list of the neighbor router, and if the determining unit determines to add the relevant information of the neighbor router into the neighbor list of the local end router, the router further comprises:
a judging unit, configured to judge whether the neighbor list of the neighbor router comprises relevant information of the local end router; and
a setting unit, configured to: if the neighbor list of the neighbor router does not comprise the relevant information of the local end router, set the state of the neighbor router in the neighbor list of the local end router to state 1, wherein the state 1 is used to represent that the local end router discovers the neighbor router and the neighbor router does not discover the local end router; or if the neighbor list of the neighbor router comprises the relevant information of the local end router, set the state of the neighbor router in the neighbor list of the local end router to state 2, wherein the state 2 is used to represent that the local end router discovers the neighbor router and the neighbor router discovers the local end router.

9. A router, comprising:
an obtaining unit, configured to obtain a first discovery protocol Hello message sent by a neighbor router, wherein the first Hello message carries identification information and priority information of the neighbor router; and
a determining unit, configured to determine whether to add relevant information of the neighbor router into a neighbor list of a local end router, according to the priority information of the neighbor router, and/or priority information of the local end router, and/or whether the identification information of the neighbor router is identification information of an opposite end device of a virtual link configured for the local end router;
wherein the determining unit comprises:
a judging module, configured to: judge, according to the priority information of the neighbor router, whether the priority of the neighbor router is 0; if the priority of the neighbor router is 0, judge, according to the priority information of the local end router, whether the priority of the local end router is 0; and if the priority of the local end router is 0, judge whether the identification information of the neighbor router is the identification information of an opposite end device of a virtual link configured for the local end router; and
a processing module, configured to: if the judging module judges that the identification information of the neighbor router is not the identification information of an opposite end device of a virtual link configured for the local end router, discard the first Hello message.

10. The router according to claim 9, further comprising:
a first broadcasting unit, configured to broadcast a second Hello message after the processing module discards the first Hello message, wherein the second Hello message carries the identification information and priority information of the local end router and the second Hello message further carries the neighbor list of the local end router, wherein the neighbor list of the local end router does not comprise the relevant information of the neighbor router.

11. The router according to claim 9, wherein the processing module is further configured to: if the judging module judges that the priority of the neighbor router is not 0, add the relevant information of the neighbor router into the neighbor list of the local end router.

12. The router according to claim 9, wherein the processing module is further configured to: if the judging module judges that the priority of the local end router is not 0, add the relevant information of the neighbor router into the neighbor list of the local end router.

13. The router according to claim 9, wherein the processing module is further configured to: if the judging module judges that the identification information of the neighbor router is the identification information of an opposite end device of a virtual link configured for the local end router, add the relevant information of the neighbor router into the neighbor list of the local end router.

14. The router according to claim 13, further comprising:
a second broadcasting unit, configured to broadcast a third Hello message after the processing module adds the relevant information of the neighbor router into the neighbor list of the local end router, wherein the third Hello message carries the identification information and priority information of the local end router and the third Hello message further carries the neighbor list of the local end router, wherein the neighbor list of the local end router comprises the relevant information of the neighbor router.

* * * * *